United States Patent
Bashandy et al.

(10) Patent No.: US 10,367,734 B2
(45) Date of Patent: Jul. 30, 2019

(54) FORWARDING OF PACKETS IN A NETWORK BASED ON MULTIPLE COMPACT FORWARDING IDENTIFIERS REPRESENTED IN A SINGLE INTERNET PROTOCOL VERSION 6 (IPV6) ADDRESS

(71) Applicant: Cisco Technology, Inc., San Jose, CA (US)

(72) Inventors: Ahmed Refaat Bashandy, Santa Clara, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 15/646,289

(22) Filed: Jul. 11, 2017

(65) Prior Publication Data

US 2019/0020583 A1    Jan. 17, 2019

(51) Int. Cl.
*H04L 12/28* (2006.01)
*H04L 12/741* (2013.01)
*H04L 29/12* (2006.01)

(52) U.S. Cl.
CPC .......... *H04L 45/74* (2013.01); *H04L 61/6004* (2013.01); *H04L 61/6072* (2013.01); *H04L 61/6059* (2013.01)

(58) Field of Classification Search
CPC ............................ H04L 45/74; H04L 61/6059
USPC ........................................................ 370/392
See application file for complete search history.

(56) References Cited

U.S. PATENT DOCUMENTS 9,537,769 B2    1/2017  Bryant et al.
2010/0265869 A1*  10/2010  Sarikaya ............. H04L 12/1836
                                                         370/312

OTHER PUBLICATIONS

Filsfls et al., Segment Routing Architecture draft-ietf-spring-segement-routing-12, Jun. 20, 2017 (from Applicant's IDS filed on Jul. 11, 2017) (Year: 2017).*
T. Bates et al., "Multiprotocol Extensions for BGP-4," RFC 4760, Jan. 2007, The Internet Society, Reston, VA, USA (twelve pages).
S. Deering and R. Hinden, "Internet Protocol, Version 6 (IPv6) Specification," RFC 8200, Jul. 2017, The Internet Society, Reston, VA, USA (forty-two pages).

(Continued)

*Primary Examiner* — Mang Hang Yeung
(74) *Attorney, Agent, or Firm* — The Law Office of Kirk D. Williams

(57) ABSTRACT

In one embodiment, packets are forwarded in a network based on multiple compact forwarding identifiers represented in a single 128-bit Internet Protocol Version 6 (IPv6) address, such as, but not limited to being in the destination address field of the IPv6 header (e.g., possibly in an extended IPv6 header). One embodiment follows the forwarding order of these multiple compact forwarding identifiers by respectively placing them in the single IPv6 address from high-order to lower-order bit positions. In one embodiment, a compact forwarding identifier prefix is part of the address represented by each compact forwarding identifier, typically with the compact forwarding identifier prefix stored in the highest-order bit positions. One embodiment uses a longest prefix matching operation to match the compact forwarding identifier to be used in determining how to next process the packet.

20 Claims, 7 Drawing Sheets

(56) References Cited

OTHER PUBLICATIONS

Filsfls et al., "SRv6 Network Programming," draft-filsfils-spring-srv6-network-programming-00, Mar. 9, 2017, The Internet Society, Reston, VA, USA (forty-one pages).
Filsfls et al., "SRv6 Network Programming," draft-filsfils-spring-srv6-network-programming-01, Jun. 28, 2017, The Internet Society, Reston, VA, USA (forty-two pages).
Filsfls et al., "Segment Routing Architecture," draft-ietf-spring-segment-routing-11, Feb. 16, 2017, The Internet Society, Reston, VA, USA (twenty-eight pages).
Filsfls et al., "Segment Routing Architecture," draft-ietf-spring-segment-routing-12, Jun. 20, 2017, The Internet Society, Reston, VA, USA (twenty-eight pages).
Previdi et al., "IPv6 Segment Routing Header (SRH)," draft-ietf-6man-segment-routing-header-06, Mar. 13, 2017, The Internet Society, Reston, VA, USA (thirty-five pages).
Rekhter et al., "A Border Gateway Protocol 4 (BGP-4)," RFC 4271, Jan. 2006, The Internet Society, Reston, VA, USA (104 pages).
Bates et al., "Multiprotocol Extensions for BGP-4," RFC 2283, Feb. 1998, The Internet Society, Reston, VA, USA (nine pages).
Deering et al., "Internet Protocol, Version 6 (IPv6) Specification," RFC 2460, Dec. 1998, The Internet Society, Reston, VA, USA (thirty-nine pages).
Rosen et al., "Multiprotocol Label Switching Architecture," RFC 3031, Jan. 2001, The Internet Society, Reston, VA, USA (sixty-one pages).
"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).

* cited by examiner

FORWARDING OF PACKETS IN A NETWORK BASED ON MULTIPLE COMPACT FORWARDING IDENTIFIERS REPRESENTED IN A SINGLE INTERNET PROTOCOL VERSION 6 (IPV6) ADDRESS

TECHNICAL FIELD

The present disclosure relates generally to sending of packets in a packet network, including in packets with multiple forwarding addresses represented in a single Internet Protocol Version 6 (IPv6) 128-bit address.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network forwarded based one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
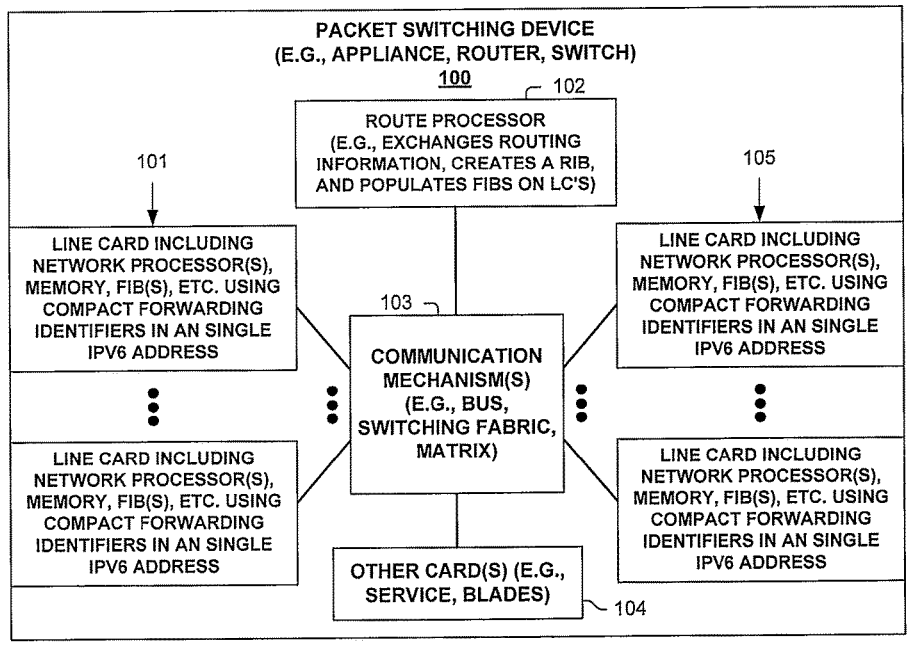
FIG. 1A illustrates a packet switching device according to one embodiment.

Disclosed are, inter alia, methods, apparatus, computer-storage media, mechanisms, and means associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header). One embodiment follows the forwarding order of these multiple compact forwarding identifiers by respectively placing them in the single IPv6 address from high-order to lower-order bit positions. In one embodiment, a compact forwarding identifier prefix is part of the address represented by each compact forwarding identifier, typically with the compact forwarding identifier prefix stored in the highest-order bit positions. One embodiment uses a longest prefix matching operation to match the compact forwarding identifier to be used in determining how to next process the packet.

In one embodiment, a first network node receives an Internet Protocol version 6 (IPv6) packet with the IPv6 header including a particular destination address of length 128 bits in the destination address field of the IPv6 header. This particular destination address includes encoded therein a first destination address and a second destination address, with the first destination address corresponding to the first network node and the second destination address corresponding to a second network node. The first network node changes the particular destination address to an updated particular destination address of length 128 bits, with the updated particular destination address including encoded therein the second destination address. The first network node sends the IPv6 packet with the destination address field in the destination address field of the IPv6 header including the updated particular destination address.

In one embodiment, the particular destination address includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier.

In one embodiment, a first network node receives an IPv6 packet with a particular address, with the particular address including encoded therein a first destination address and a second destination address, with the particular address being 128 bits in length and located in a 128-bit address field of the IPv6 packet, and with the first destination address corresponding to the first network node and the second destination address corresponding to a second network node. The first network node determines a forwarding result based on performing a lookup operation in at least one of one or more forwarding data structures based on the second destination address or search key including the second destination address encoded therein. Based on the forwarding result, the first network node sends the IPv6 packet from the first network node.

In one embodiment, the particular address in the received IPv6 packet includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier.

One embodiment includes a packet switching device, comprising a plurality of hardware interfaces sending and receiving packets, and one or more network processors with memory associated therewith. The packet switching device performs packet processing operations, with said packet processing operations in one embodiment including: receiving via one of the plurality of hardware interfaces a packet with a first particular value, with the first particular value including encoded therein a first destination address and a second destination address, with the first particular value being 128 bits in length and located in a 128-bit Internet Protocol Version 6 (IPv6) address field of the packet, and with the first destination address corresponding to the first network node and the second destination address corresponding to a second network node; modifying the particular value to become a second particular value of length 128 bits, with the second particular destination address including encoded therein the second destination address; performing a lookup operation in one or more data structures based on the second particular value or the second destination address resulting in the determination of a lookup result; and responsive to the lookup result, sending the packet with the second particular value from the packet switching device via one or more of the plurality of hardware interfaces.

In one embodiment, the first particular value includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier but not the first compact forwarding identifier.

In one embodiment, the first particular value in said received packet includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier; wherein the highest-order bits of the first particular value in said received packet are the compact forwarding identifier prefix followed by the first compact forwarding identifier; and wherein the highest-order bits of the second particular value in said sent packet are the compact forwarding identifier prefix followed by the second compact forwarding identifier.

2. Description

Disclosed are, inter alia, methods, apparatus, computer-storage media, mechanisms, and means associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header). In one embodiment, such forwarding of the packet includes modifying the contents of the single IPv6 address to a new value to represent the next address. In one embodiment, a compact forwarding identifier represents a segment identifier, a forwarding label or index (e.g., an MPLS label, an index value in an MPLS label space), a forwarding address (e.g., an IPv4 or IPv6 address), and/or another value used in making forwarding decisions of packets in a network. A common definition of compact is occupying little space compared with others. Thus, the adjective "compact" is used to suggest a typically, but not required, property of such a forwarding identifier (e.g., a 128-bit IPv6 address representing multiple addresses or values, not just a single address).

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The term "route" is used to refer to a fully or partially expanded prefix (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated. The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x"

is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

Figure 1B:
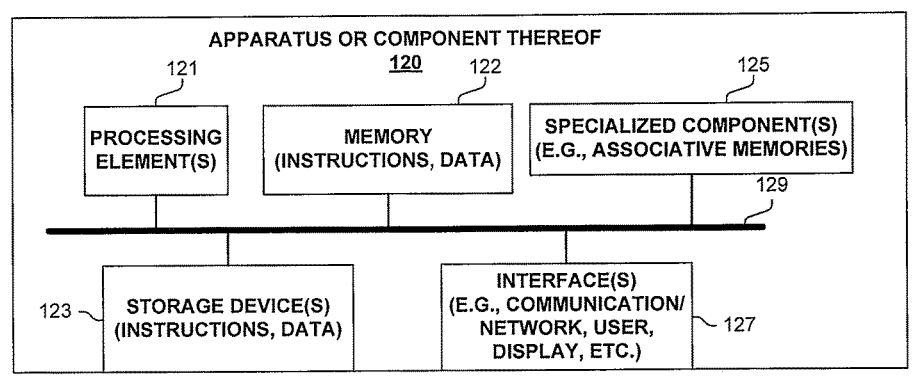
FIG. 1B illustrates an apparatus according to one embodiment.

FIGS. 1A-B and their discussion herein are intended to provide a description of various exemplary packet switching systems used in forwarding packets according to one embodiment. One embodiment forwards packets in a network based on multiple compact forwarding identifiers represented in a single 128-bit Internet Protocol Version 6 (IPv6) address, such as, but not limited to being in the destination address field of the IPv6 header (e.g., in an extended IPv6 header).

One embodiment of a packet switching device 100 is illustrated in FIG. 1A. As shown, packet switching device 100 includes multiple line cards 101 and 105, each with one or more network interfaces for sending and receiving packets over communications links (e.g., possibly part of a link aggregation group), and with one or more processing elements that are used in one embodiment associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header). Packet switching device 100 also has a control plane with one or more processing elements 102 for managing the control plane and/or control plane processing of packets associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header). Packet switching device 100 also includes other cards 104 (e.g., service cards, blades) which include processing elements that are used in one embodiment to process (e.g., forward/send, drop, manipulate, change, modify, receive, create, duplicate, apply a service) packets associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header), and some hardware-based communication mechanism 103 (e.g., bus, switching fabric, and/or matrix, etc.) for allowing its different entities 101, 102, 104 and 105 to communicate.

Line cards 101 and 105 typically perform the actions of being both an ingress and egress line card, in regards to multiple other particular packets and/or packet streams being received by, or sent from, packet switching device 100. In one embodiment, network processors on line cards 101 and/or 105 forwards packets in a network represented in a single 128-bit Internet Protocol Version 6 (IPv6) address, such as, but not limited to being in the destination address field of the IPv6 header (e.g., in an extended IPv6 header).

FIG. 1B is a block diagram of an apparatus 120 used in one embodiment associated with forwarding of packets in a network based on multiple compact forwarding identifiers represented in a single 128-bit Internet Protocol Version 6 (IPv6) address, such as, but not limited to being in the destination address field of the IPv6 header (e.g., in an extended IPv6 header). In one embodiment, apparatus 120 performs one or more processes, or portions thereof, corresponding to one of the flow diagrams illustrated or otherwise described herein, and/or illustrated in another diagram or otherwise described herein.

In one embodiment, apparatus 120 includes one or more processor(s) 121 (typically with on-chip memory), memory 122, storage device(s) 123, specialized component(s) 125 (e.g. optimized hardware such as for performing lookup and/or packet processing operations, associative memory, binary and/or ternary content-addressable memory, etc.), and interface(s) 127 for communicating information (e.g., sending and receiving packets, user-interfaces, displaying information, etc.), which are typically communicatively coupled via one or more communications mechanisms 129 (e.g., bus, links, switching fabric, matrix), with the communications paths typically tailored to meet the needs of a particular application.

Various embodiments of apparatus 120 may include more or fewer elements. The operation of apparatus 120 is typically controlled by processor(s) 121 using memory 122 and storage device(s) 123 to perform one or more tasks or processes. Memory 122 is one type of computer-readable/computer-storage medium, and typically comprises random access memory (RAM), read only memory (ROM), flash memory, integrated circuits, and/or other memory components. Memory 122 typically stores computer-executable instructions to be executed by processor(s) 121 and/or data which is manipulated by processor(s) 121 for implementing functionality in accordance with an embodiment. Storage device(s) 123 are another type of computer-readable medium, and typically comprise solid state storage media, disk drives, diskettes, networked services, tape drives, and other storage devices. Storage device(s) 123 typically store computer-executable instructions to be executed by processor(s) 121 and/or data which is manipulated by processor(s) 121 for implementing functionality in accordance with an embodiment.

Figure 1C:
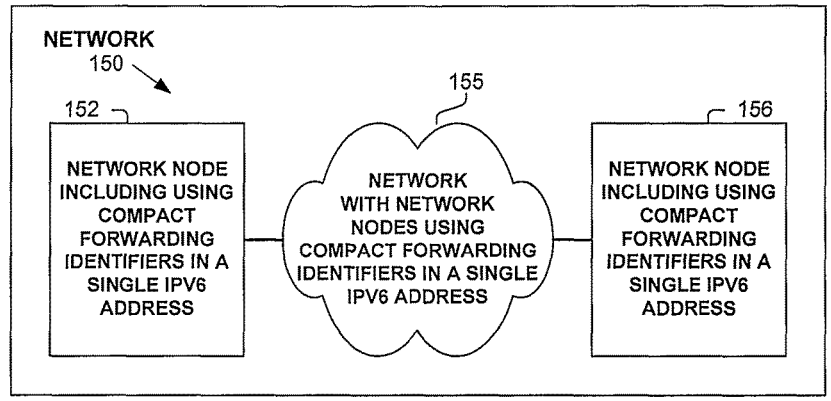
FIG. 1C illustrates a network operating according to one embodiment.

FIG. 1C illustrates a network 150 operating according to one embodiment. As shown, network 150 includes multiple network nodes 152, 156 and network 155 including network nodes, each of which send and receive packets from other nodes in network 155 and/or other communicatively coupled nodes. In one embodiment, at least one of multiple network nodes 152, 156 and in network 155 forwards packets based on one or more compact forwarding identifiers represented in a single 128-bit Internet Protocol Version 6 (IPv6) address, such as, but not limited to being in the destination address field of the IPv6 header (e.g., in an extended IPv6 header).

Figure 2A:
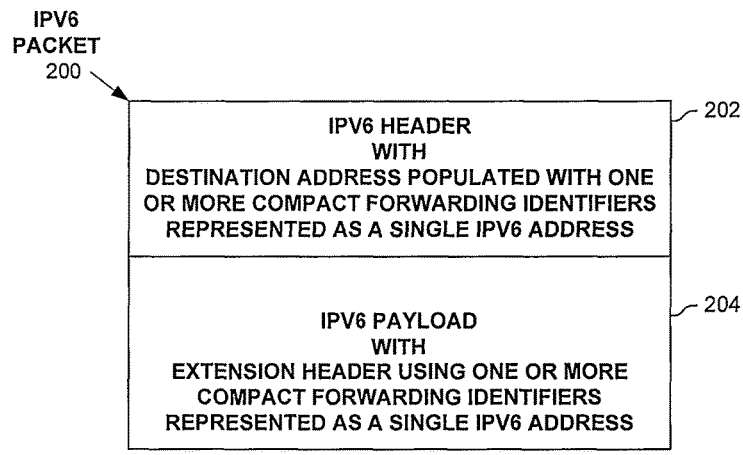
FIG. 2A illustrates a IPv6 packet to one embodiment.

FIG. 2A illustrates a IPv6 packet 200 according to one embodiment forwarding packets in a network based on one or more compact forwarding identifiers represented in a single 128-bit Internet Protocol Version 6 (IPv6) address. As show, IPv6 packet inherently includes the IPv6 header 202 and IPv6 payload 204. Thus, a reference to "the IPv6 header" refers to this header, not an extension header in the IPV6 payload discussed in the next paragraph.

In one embodiment, the destination address field of the IPv6 header 202 is populated with one or more compact forwarding identifiers represented as a 128-bit IPv6 address.

In one embodiment, a forwarding value field (e.g., for a label, segment identifier, IPv6 address, other value) in an extension header (or other forwarding information storage) of IPv6 payload 204 is populated with one or more compact forwarding identifiers represented as a 128-bit IPv6 address.

Figure 2B:
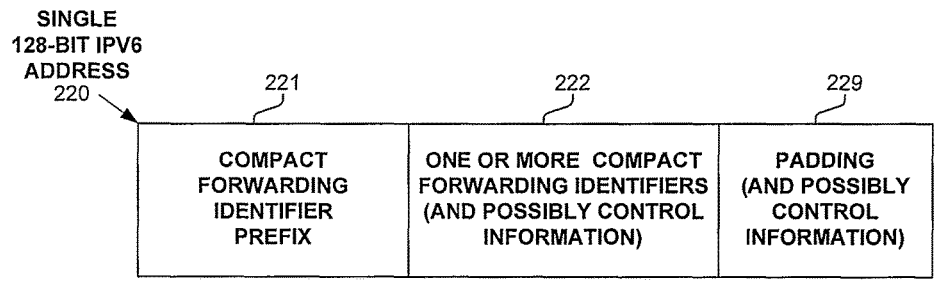
FIG. 2B illustrates one or more compact forwarding identifiers represented in a single 128-bit IPv6 address according to one embodiment.

FIG. 2B illustrates one or more compact forwarding identifiers 222 represented in a single 128-bit IPv6 address 220 according to one embodiment. In one embodiment, the single IPv6 address 220 includes a compact forwarding identifier prefix 221, one or more compact forwarding identifiers 222, and padding 229 (as needed to fill out the 128 bits). In one embodiment, compact forwarding identifier prefix 221 is placed in the highest-order bits of IPv6 address 220 and identifies an address space and possibly encoding format for the compact forwarding identifier(s) 222. In one embodiment, compact forwarding identifier prefix 221 is forty-eight bits, with the remaining eighty bits used in storing one or more compact forwarding identifiers 222 and padding 229. In one embodiment, compact forwarding identifiers field 222 and/or padding 229 include control information (e.g., an offset value, counter, list position indication), such as for, but not limited to identifying an actual compact forwarding identifier stored in field 222 to currently use and/or to use in the future. In one embodiment, a node searches and locates the position of its corresponding compact forwarding identifier in compact forwarding identifiers field 222 and then uses the next identifier in the sequence if any remain or processes the packet accordingly if there is no other identifier.

Figure 3A:
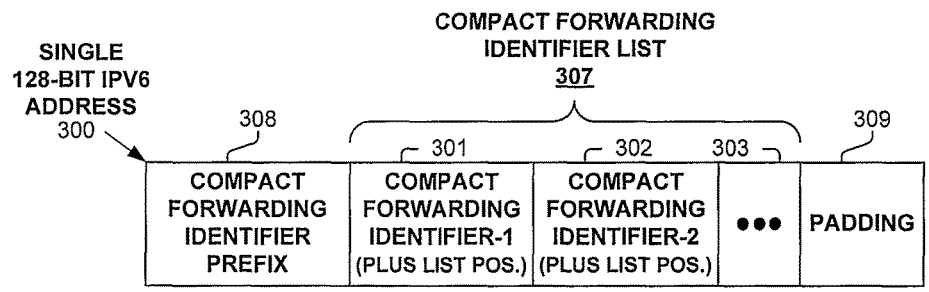
FIG. 3A illustrates one or more compact forwarding identifiers represented in a single 128-bit IPv6 address according to one embodiment.

Further in illustration, FIG. 3A illustrates one or more compact forwarding identifiers 301-303 stored in a list format 307 and represented in a single 128-bit IPv6 address 300 according to one embodiment. As shown, the single IPv6 address 300 includes a compact forwarding identifier prefix 308, a list 307 of one or more compact forwarding identifiers 301-303 each with a list position indication, and padding 309 (as needed to fill out the 128 bits). In one embodiment, a list position indication (e.g., one or more bits) is a value of zero to indicate that the compact forwarding identifier is not the last one in list 307, and a value of one to indicate that it is the last one in list 307. In one embodiment, a list position indication is a value of one to indicate that the compact forwarding identifier is not the last one in list 307, and a value of zero to indicate that it is the last one in list 307. In one embodiment, the value of compact forwarding identifier prefix 308 has associated with it a predetermined length of itself as well as each compact forwarding identifier 301-303 providing information for decoding of the single 128-bit IPv6 address. In one embodiment, an encoded IPv6 address or value (e.g., segment identifier, label or other value to be represented as an IPv6 address) encoded in IPv6 address 300 is the compact forwarding identifier prefix 308 concatenated with a compact forwarding identifier 301-303.

Figure 3B:
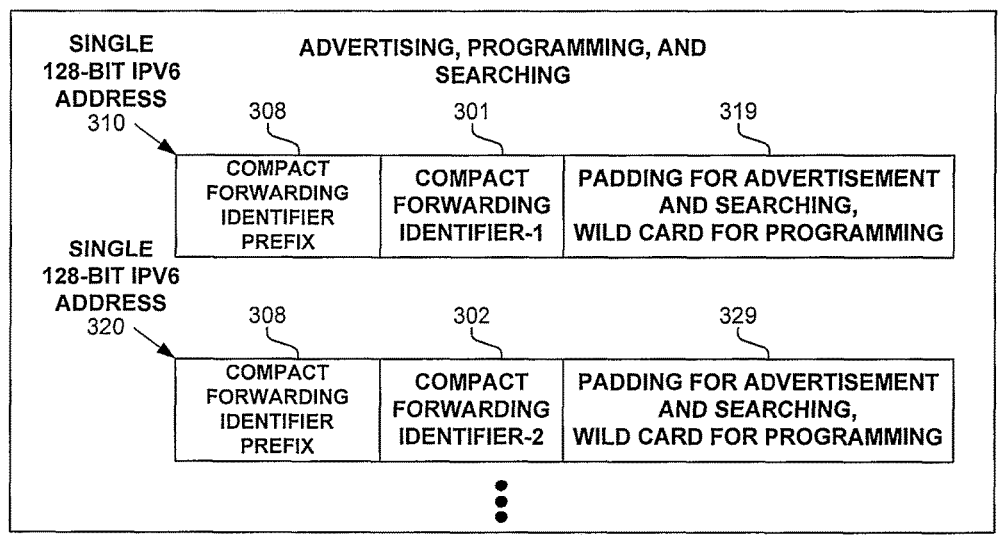
FIG. 3B illustrates advertisement and forwarding information programming according to one embodiment.

In one embodiment, an encoded IPv6 address or value encoded in IPv6 address 300 is compact forwarding identifier prefix 308 concatenated with compact forwarding identifier 301 (at the top of list 307), which conveniently occupies the highest order bits of address 300, with other bits within the encoded IPv6 address being zero or more compact forwarding identifiers 302-303 and/or padding 309 (filling in zero or more bit positions)—depending on the context of packet forwarding, route advertisement, forwarding information base programming, etc., such as, but not limited to that described and/or illustrated herein. FIG. 3B illustrates such advertising and programming, and FIGS. 3C-3E illustrate such modification of IPv6 address 300 in forwarding of a packet, with an example further illustrated in FIGS. 4A-4B.

FIG. 3B illustrates advertising, programming, and searching of decoded IPv6 addresses 310 and 320 derived from IPv6 address 300 (of FIG. 3A). As shown, single 128-bit IPv6 address 310 includes compact forwarding prefix 308 and compact forwarding identifier-1 (301); and single 128-bit IPv6 address 320 includes compact forwarding prefix 308 and compact forwarding identifier-2 (302). Remaining bits 319, 329 are padded when used for route advertising and as a search key (e.g., for longest prefix matching), and are wildcard or don't care for programming of a data structure to be searched (e.g., a forwarding information base).

Figure 3C:
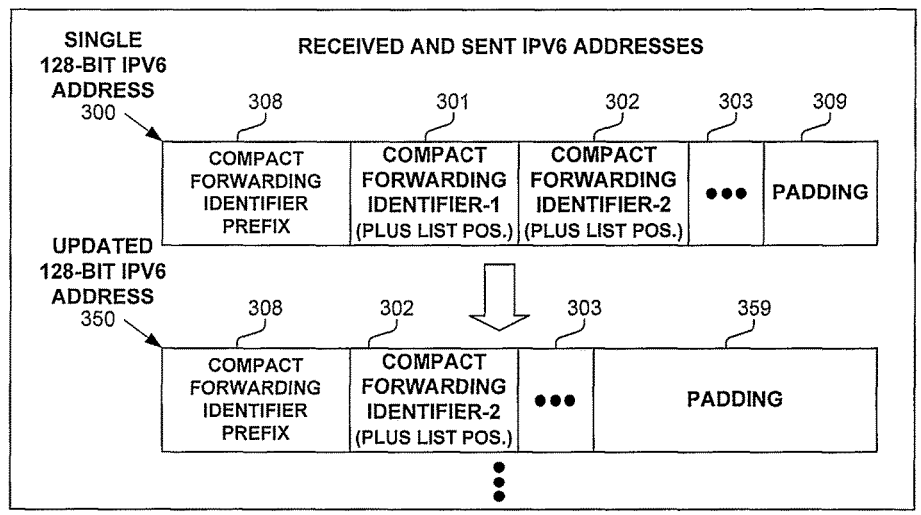
FIG. 3C illustrates changing of one or more compact forwarding identifiers represented in a single 128-bit IPv6 address during packet forwarding according to one embodiment.

FIG. 3C illustrates the updating of IPv6 address 300 as packets are sent to a next destination encoded in IPv6 address 300. Initially, IPv6 address 300 is as described in relation to FIG. 3A. In one embodiment, an IPv6 packet is sent to a first network node identified by an IPv6 address with its high-order bits of compact forwarding identifier prefix 308 concatenated with compact forwarding identifier 301 (without the list position indication) followed by padding 309, with the IPv6 destination address field in its IPv6 header being populated with IPv6 address 300. First network node receives and processes the IPv6 packet including changing of IPv6 address 300 to that of IPv6 address 350 by removing compact forwarding identifier-1 (301) typically by shifting the remaining portions 302, 303 and 359 to the left such that the highest-order bits of IPv6 address 350 are those of compact forwarding identifier prefix 308 concatenated with compact forwarding identifier 302 (representing a network address of a second network node). The IPv6 packet is sent from the first network node towards the second network node, with this IPv6 packet including the updated IPv6 address 350 in the IPv6 destination address field in its IPv6 header.

Figure 4A:
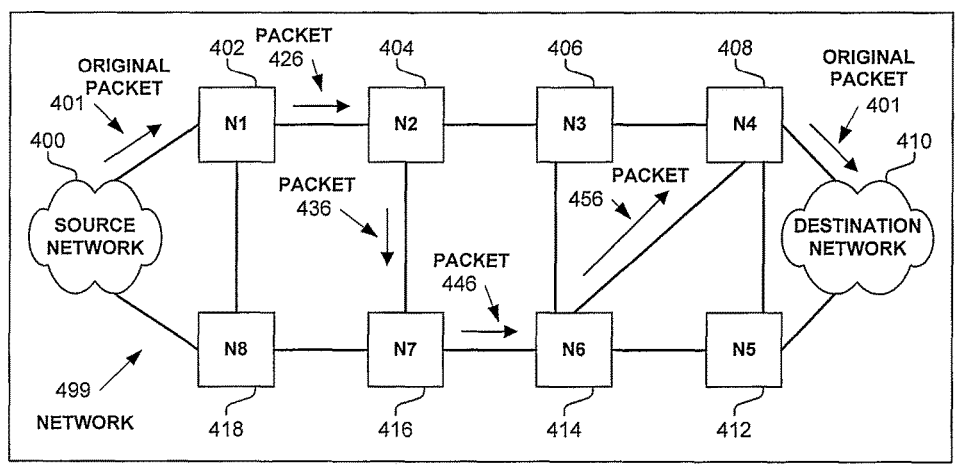
FIG. 4A illustrates a network operating according to one embodiment.
Figure 4B:
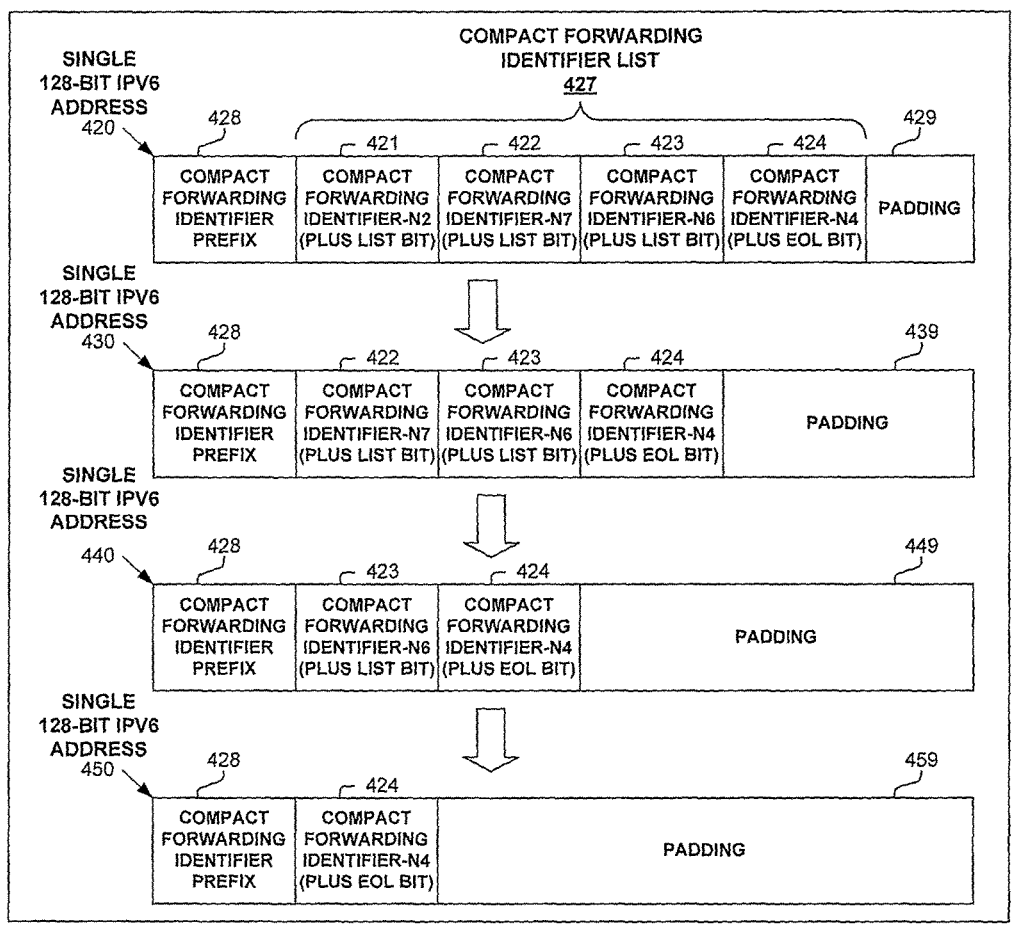
FIG. 4B illustrates changing of one or more compact forwarding identifiers represented in a single 128-bit IPv6 address during packet forwarding according to one embodiment.

FIG. 4A illustrates a network 499 operating according to one embodiment, with various IPv6 addresses correspondingly used as illustrated in FIG. 4B. The following description will refer to entities from both FIGS. 4A and 4B.

Network 499 includes a source network 400 (of one or more network nodes) communicatively coupled to a destination network 410 (of one or more network nodes), communicatively coupled by network nodes 402-408 and 412-418 as shown by the illustrated links.

In one embodiment, an original packet 401 is being sent from source network 400 to destination network 410. Initially, network node N1 (402) receives original packet 402, and determines (typically based on a lookup operation of its destination address) to route packet 401 over a particular path via the order of network nodes 404, 416, 414, 408. In response, network node N1 (402) determines single 128-bit IPv6 address 420 with a compact forwarding identifier prefix 428, compact forwarding identifier list 427, and padding 429. Compact forwarding identifier list 427 includes compact forwarding identifiers 421-424 corresponding to the order of network nodes 404, 416, 414, 408. Network node N1 (402) encapsulates original packet 401 and sends the resultant IPv6 packet with IPv6 address 420 in the IPv6 destination address of its IPv6 header.

Network node N2 (404) receives IPv6 packet 426, and performs a longest prefix matching operation on its destination address IPv6 address 420 to determine how to process IPv6 packet 426. Responsive to the lookup result, IPv6 address 420 is changed to IPv6 address 430 (removing field 421 and shifting fields 422-424, with longer padding 439). Responsive to a result of a longest prefix matching operation performed on IPv6 address 430, the resultant IPv6 packet 436 with IPv6 address 430 in the IPv6 destination address of its IPv6 header is sent from network node N2 (404).

Network node N7 (416) receives IPv6 packet 436, and performs a longest prefix matching operation on its destination address IPv6 address 430 to determine how to process IPv6 packet 436. Responsive to the lookup result, IPv6 address 430 is changed to IPv6 address 440 (removing field 422 and shifting fields 423-424, with longer padding 449). Responsive to a result of a longest prefix matching operation performed on IPv6 address 440, the resultant IPv6 packet 446 with IPv6 address 440 in the IPv6 destination address of its IPv6 header is sent from network node N7 (416).

Network node N6 (414) receives IPv6 packet 446, and performs a longest prefix matching operation on its destination address IPv6 address 440 to determine how to process IPv6 packet 446. Responsive to the lookup result, IPv6 address 440 is changed to IPv6 address 450 (removing field 423 and shifting field 424, with longer padding 459). Responsive to a result of a longest prefix matching operation performed on IPv6 address 450, the resultant IPv6 packet 456 with IPv6 address 450 in the IPv6 destination address of its IPv6 header is sent from network node N6 (414).

Network node N4 (408) receives IPv6 packet 456, and performs a longest prefix matching operation on its destination address IPv6 address 450 to determine how to process IPv6 packet 456. Responsive to the lookup result and the End of List indication for compact forwarding identifier list 427, network node N4 (408) decapsulate received packet 456 revealing original packet 401. Responsive to the result of a lookup operation on the destination address of original packet 401, original packet 401 is sent from network node N4 (408) to destination network 410.

Figure 5A:
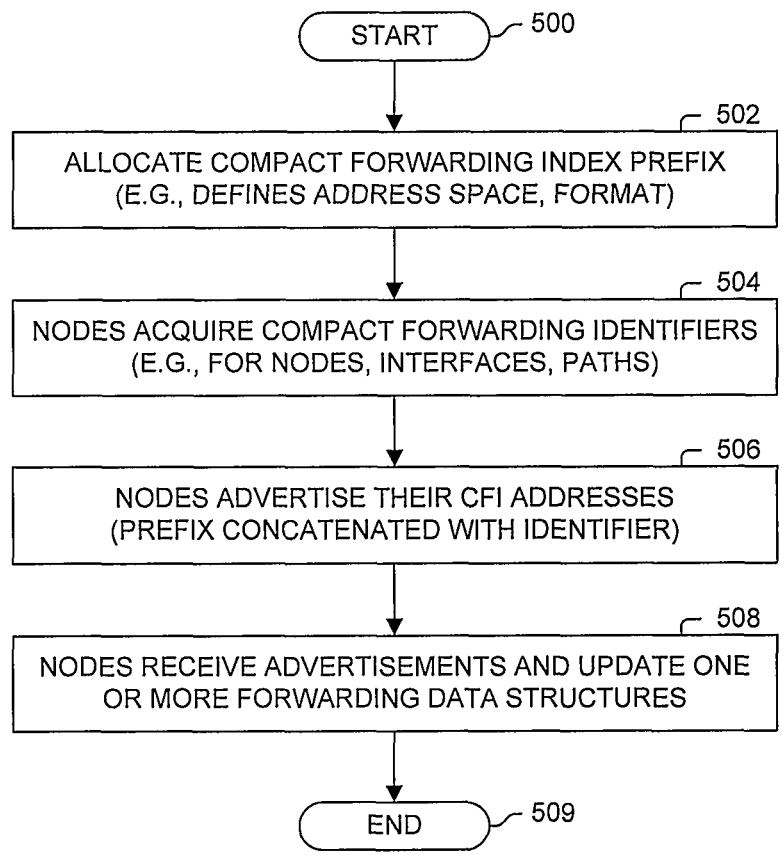
FIG. 5A illustrates a process according to one embodiment.

FIG. 5A illustrates a process according to one embodiment. Processing begins with process block 500. In process block 502, a compact forwarding identifier prefix is allocated. In one embodiment, identified therewith is a corresponding format of the encoding within the IPv6 address (e.g., the length of the prefix, the length a compact forwarding identifier, control information). In one embodiment, the format is the same for all compact forwarding identifier prefixes. In process block 504, each participating network node acquires one or more compact forwarding identifiers, such as, but not limited to, corresponding to the network node itself, interfaces of the network node, egress paths or processing associated with the network node. In process block 506, the network nodes advertise their respective compact forwarding identifier addresses (e.g., each combination of compact forwarding identifier prefix concatenated with one of its compact forwarding identifiers). In one embodiment, a standard routing protocol (e.g., BGP-4, IS-IS) or a label distribution protocol is used. In process block 508, participating network nodes receive these advertisements and update their routing and forwarding data structures accordingly. In one embodiment, non-participating network nodes (e.g., network nodes that do not modify the IPv6 address with compact forwarding identifier encoded therein) will exchange these advertisements, update their routing and forwarding data structures accordingly, and forward packets properly as these advertisements are simply advertisements of routes which they can process normally. Processing of the flow diagram of FIG. 5A is complete as indicated by process block 509.

Figure 5B:
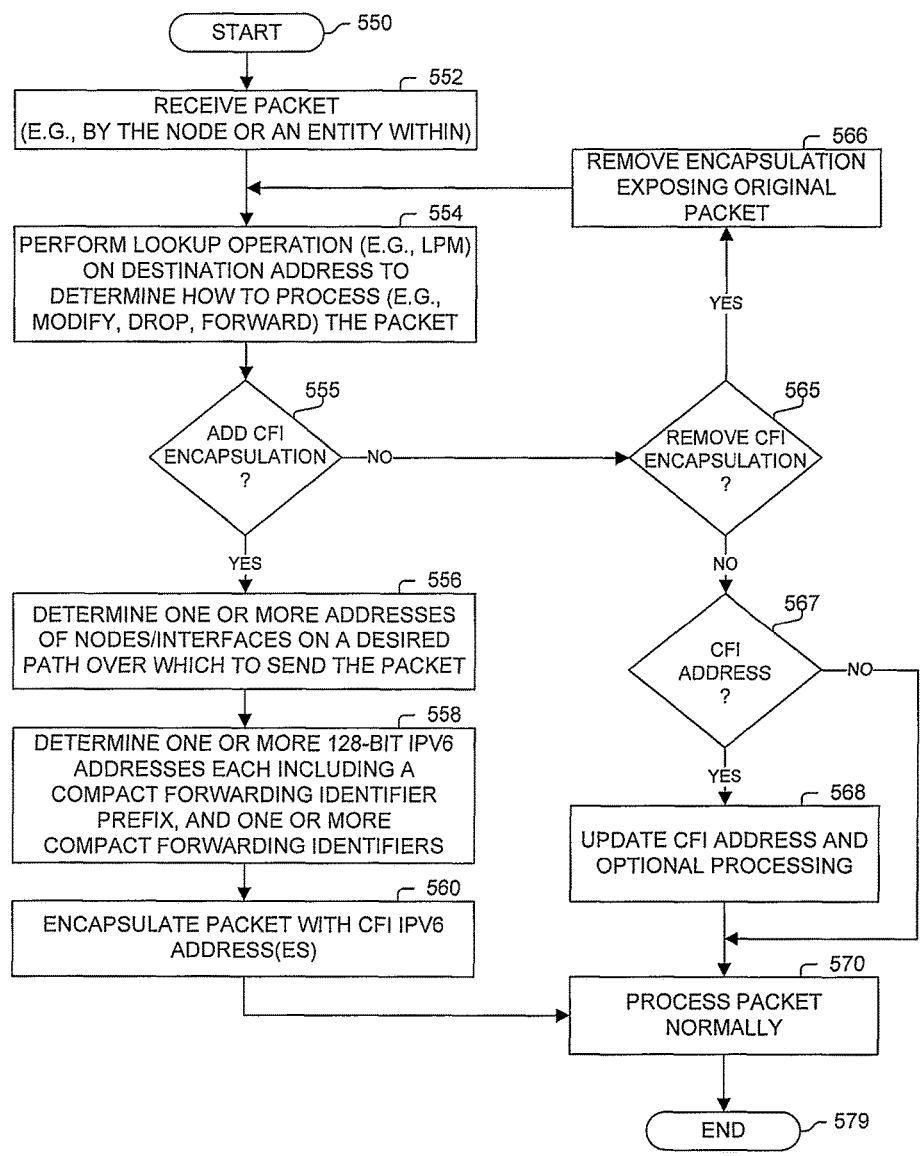
FIG. 5B illustrates a process according to one embodiment.

FIG. 5B illustrates a process according to one embodiment. Processing begins with process block 550. In process block 552, a packet is received. In process block 554, a lookup operation is performed on the IPv6 destination address of the received packet to determine how to process the packet. In one embodiment, this lookup operation is a longest matching prefix operation. In one embodiment, this lookup operation is performed on a value corresponding to a compact forwarding identifier prefix concatenated with a first compact forwarding identifier in the IPv6 destination address.

As determined in process block 555, if the node is to encapsulate the packet and add an IPv6 destination address with multiple addresses encoded therein, processing proceeds to process block 556; else processing proceeds to process block 565.

Proceeding from process block 555 to process block 556, a path over which to send the IPv6 packet encapsulating the original packet is determined in process block 556. In process block 558, the compact forwarding identifier prefix and corresponding one or more compact forwarding identifiers to encode in an IPv6 address are determined resulting in a 128-bit IPv6 destination address. In process block 560, the encapsulating IPv6 packet is created including placing the 128-bit IPv6 destination address in the IPv6 destination address field of with the IPv6 header. In process block 570, the encapsulating IPv6 is processed normally (e.g., lookup and forwarding operations performed thereon). Processing of the flow diagram of FIG. 5B is complete as indicated by process block 579.

Proceeding from process block 555 to process block 565. As determined in process block 565, if an IPv6 encapsulating packet using compact forwarding identifiers is received with no more compact forwarding identifiers to use (e.g., at the end of the list), then processing proceeds to process block 566; else processing proceeds to process block 567.

Proceeding from process block 565 to process block 566. In process block 566, the original packet is decapsulated, with processing proceeding to process block 554 to process the original packet.

Proceeding from process block 565 to process block 567. As determined in process block 567, if the IPv6 destination address has a compact forwarding identifier prefix, then processing proceeds to process block 568; else processing proceeds directly to process block 570.

Proceeding from process block 567 to process block 568. In process block 568, the IPv6 destination address is updated for the next compact forwarding identifier (and possibly some additional processing). Processing proceeds to process block 570 to process the IPv6 packet with the updated IPv6 destination address. Processing of the flow diagram of FIG. 5B is complete as indicated by process block 579.

Proceeding from process block 567 directly to process block 570. In process block 570, the packet is processed normally. Processing of the flow diagram of FIG. 5B is complete as indicated by process block 579.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

receiving, by a first network node, an Internet Protocol version 6 (IPv6) packet with the IPv6 header including a particular destination address of length 128 bits in the destination address field of the IPv6 header, with the particular destination address including encoded therein a first destination address and a second destination address, with the first destination address corresponding to the first network node and the second destination address corresponding to a second network node;

changing, by the first network node, the particular destination address to an updated particular destination address of length 128 bits, with the updated particular destination address including encoded therein the second destination address; and sending, from the first network node, the IPv6 packet with the destination address field in the destination address field of the IPv6 header including the updated particular destination address.

2. The method of claim 1, wherein the particular destination address includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier.

3. The method of claim 2, wherein the particular destination address includes the compact forwarding identifier prefix concatenated with the first compact forwarding identifier; and the updated particular destination address includes the compact forwarding identifier prefix concatenated with the second compact forwarding identifier.

4. The method of claim 3, wherein the particular destination address includes, in the following order: the compact forwarding identifier prefix, a first compact forwarding identifier, and a second compact forwarding identifier.

5. The method of claim 2, wherein the compact forwarding identifier prefix identifies an encoding format for the particular destination address and the updated particular destination address.

6. The method of claim 2, further comprising the limitations of:

programming, by the first network node, one or more forwarding data structures with a first entry including the compact forwarding identifier prefix and the first compact forwarding identifier, and with a second entry including the compact forwarding identifier prefix and the second compact forwarding identifier;

processing, by the first network node, the IPv6 packet in response to a first lookup operation performed in at least one of said forwarding data structures based on the particular destination address resulting in a match of the first entry; and performing a second lookup operation in at least one of said forwarding data structures based on the updated particular destination address resulting in a match of the second entry based on which the first network node determines to perform said sending the IPv6 packet;

wherein said processing includes said changing the particular destination address, said performing the second lookup operation, and said sending the IPv6 packet.

7. The method of claim 6, further comprising the limitations of:

the first network node advertising that it is associated with a first 128-bit IPv6 address including the compact forwarding identifier prefix and the first compact forwarding identifier; and the first network node performing said programming of the second entry responsive to a received advertisement that the second network node is associated with a second 128-bit IPv6 address including the compact forwarding identifier prefix and the second compact forwarding identifier.

8. The method of claim 7, wherein the highest-order bits of the first 128-bit IPv6 address are the compact forwarding identifier prefix followed by the first compact forwarding identifier; wherein the highest-order bits of the second 128-bit IPv6 address are the compact forwarding identifier prefix followed by the second compact forwarding identifier; and wherein each of the first and second lookup operations is a longest prefix matching operation.

9. The method of claim 2, further comprising the limitations of:

programming, by the first network node, one or more forwarding data structures with a first entry including the compact forwarding identifier prefix and the first compact forwarding identifier, and with a second entry including the compact forwarding identifier prefix and the second compact forwarding identifier;

processing, by the first network node, the IPv6 packet in response to a first lookup operation performed in at least one of said forwarding data structures based on the first destination address resulting in a match of the first entry; and performing a second lookup operation in at least one of said forwarding data structures based on the second destination address resulting in a match of the second entry based on which the first network node determines to perform said sending the IPv6 packet;

wherein said processing includes said changing the particular destination address, said performing the second lookup operation, and said sending the IPv6 packet.

10. The method of claim 2, further comprising the limitations of:

programming, by the first network node, one or more forwarding data structures with an entry including the compact forwarding identifier prefix and the second compact forwarding identifier; and determining, by the first network node, to said send the IPv6 packet based on a lookup operation in at least one of said forwarding data structures based on the updated particular destination address resulting in a match of the entry.

11. The method of claim 10, wherein the first network node performs said programming of the entry responsive to a received advertisement that the second network node is associated with a 128-bit IPv6 address including the compact forwarding identifier prefix and the second compact forwarding identifier.

12. The method of claim 11, wherein the highest-order bits of the 128-bit IPv6 address are the compact forwarding identifier prefix followed by the second compact forwarding identifier; and wherein the lookup operation is a longest prefix matching operation.

13. The method of claim 2, wherein the first compact forwarding identifier is associated with a first list position indication included in the particular destination address; and wherein the second compact forwarding identifier is associated with a second list position indication included in the particular destination address and in the updated particular destination address.

14. The method of claim 1, wherein the particular destination address includes encoded therein the first destination address, the second destination address, and a third destination address corresponding to a third network node; and wherein the updated particular destination address includes encoded therein the second destination address and the third destination address.

15. A method, comprising:
receiving, by a first network node, an Internet Protocol version 6 (IPv6) packet with a particular address, with the particular address including encoded therein a first destination address and a second destination address, with the particular address being 128 bits in length and located in a 128-bit address field of the IPv6 packet, and with the first destination address corresponding to the first network node and the second destination address corresponding to a second network node;
determining a forwarding result based on performing a lookup operation in at least one of one or more forwarding data structures based on the second destination address or search key including the second destination address encoded therein; and
based on the forwarding result, sending the IPv6 packet from the first network node.

16. The method of claim 15, wherein the particular address in the received IPv6 packet includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier.

17. The method of claim 15, wherein the highest-order bits of the particular address in said received IPv6 packet are the compact forwarding identifier prefix followed by the first compact forwarding identifier; wherein the highest-order bits of the particular address in said sent IPv6 packet are the compact forwarding identifier prefix followed by the second compact forwarding identifier; wherein the search key is the particular address in said sent IPv6 packet; wherein the lookup operation is a longest prefix matching operation; and wherein the method includes modifying the particular address in said received IPv6 packet to the particular address in said sent IPv6 packet.

18. A packet switching device, comprising:
a plurality of hardware interfaces sending and receiving packets; and
one or more network processors with memory associated therewith;
wherein the packet switching device performs packet processing operations, with said packet processing operations including:
receiving via one of the plurality of hardware interfaces a packet with a first particular value, with the first particular value including encoded therein a first destination address and a second destination address, with the first particular value being 128 bits in length and located in a 128-bit Internet Protocol Version 6 (IPv6) address field of the packet, and with the first destination address corresponding to the first network node and the second destination address corresponding to a second network node;
modifying the particular value to become a second particular value of length 128 bits, with the second particular destination address including encoded therein the second destination address;
performing a lookup operation in one or more data structures based on the second particular value or the second destination address resulting in the determination of a lookup result; and
responsive to the lookup result, sending the packet with the second particular value from the packet switching device via one or more of the plurality of hardware interfaces.

19. The packet switching device of claim 18, wherein the first particular value includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier but not the first compact forwarding identifier.

20. The packet switching device of claim 18, wherein the first particular value in said received packet includes a compact forwarding identifier prefix, a first compact forwarding identifier, and a second compact forwarding identifier; wherein the first destination address includes the compact forwarding identifier prefix and the first compact forwarding identifier, and the second destination address includes the compact forwarding identifier prefix and the second compact forwarding identifier; wherein the highest-order bits of the first particular value in said received packet are the compact forwarding identifier prefix followed by the first compact forwarding identifier; and wherein the highest-order bits of the second particular value in said sent packet are the compact forwarding identifier prefix followed by the second compact forwarding identifier.

* * * * *